United States Patent [19]

Burke

[11] Patent Number: 5,137,654
[45] Date of Patent: Aug. 11, 1992

[54] PROCESS FOR RECLAIMING OIL/WATER EMULSION

[75] Inventor: John M. Burke, Kirtland, Ohio
[73] Assignee: Eaton Corporation, Cleveland, Ohio
[21] Appl. No.: 777,951
[22] Filed: Oct. 17, 1991
[51] Int. Cl.$^5$ .............................................. B01D 61/14
[52] U.S. Cl. .................................... 252/306; 210/652
[58] Field of Search ................ 204/275, 149; 210/634, 210/642, 644, 649–652; 252/302–304, 306, 308–311, 314

[56] References Cited

U.S. PATENT DOCUMENTS

| | | | |
|---|---|---|---|
| 4,016,076 | 4/1977 | Lefeure | 210/61 |
| 4,728,410 | 3/1988 | Renzler | 204/275 |
| 4,778,614 | 10/1989 | Rawlinson et al. | 252/4915 |
| 4,822,507 | 4/1989 | Kauamori et al. | 252/4915 |
| 4,846,976 | 4/1989 | Ford | 210/369 |

OTHER PUBLICATIONS

Lubrication Engineering, vol. 47,8, pp. 653–659 and 686–690 Aug. 1991.

Primary Examiner—Frank Sever
Attorney, Agent, or Firm—A. E. Chrow

[57] ABSTRACT

A process (50) is provided that operates to convey a contaminated oil/water emulsion metalworking fluid (2) under pressure through an ultrafilter membrane (12) to separate a substantial amount of oil (14) therefrom that is then emulsified with a predetermined amount of water having an electrical volume resistivity of at least about 3000 ohm-cm to provide a reconditioned oil/water emulsion for use as a metalworking fluid.

10 Claims, 1 Drawing Sheet

PROCESS FOR RECLAIMING OIL/WATER EMULSION

INTRODUCTION

This invention relates generally to a process for reclaiming or reconditioning a contaminated oil/water emulsion type metal working fluid and more particularly to such process including an ultrafilter operative to separate a substantial amount of the oil from the contaminated portion of the fluid and then emulsifying the separated oil with a predetermined amount of water having an electrical volume resistivity of at least about 3000 ohm-cm.

BACKGROUND OF THE INVENTION

Emulsified oil/water type metal working fluids are well known in the art and generally comprise a suspension of oil droplets in water containing emulsifying agents and other materials such as corrosion inhibitors and/or pH stabilizing agents. For purposes of this invention, the term "oil/water emulsion" includes both oil-in-water emulsion where the oil is commonly added to the water with the water being the continuous phase and the oil the discontinuous phase (i.e. droplets) and water-in-oil emulsion in which the phases are reversed and are commonly called invert emulsions. The oil constituent may be petroleum based paraffinic and/or naphthenic oil and often constitutes at least about 60% by volume of the metal working fluid. The term "oil" may also apply to petroleum like fluids such as polyolesters, polyalpha olefins, trigycerides and the like, where as these fluids are known for their lubricity qualities and are generally not water miscible. These fluids are typically referred to as synthetic lubricants. Emulsified oil generally has a milky appearance and contains oil particles having diameters larger than about 3 microns and commonly from about 80 microns to about 200 microns.

Numerous emulsifying agents are known in the art of which one example is an alkyl benzene sulphonate such as polyisobutene succinimide disclosed in U.S. Pat. No. 4,778,614, the disclosure of which is incorporated herein by reference. The referenced patent also discloses examples of other materials commonly added to oil/water emulsions such as defoaming agents like a suitable Freidel Krafts wax. Suitable emulsion defoaming agents based upon silicon may for example be purchased from the Dow Chemical Company. Emulsifying agents are more broadly disclosed in U.S. Pat. No. 4,822,507, the disclosure of which is incorporated herein by reference, where they are described as anionic surface active agents such as fatty acid soaps, sulfonates and naphthenic acid soaps or as cationic surface active agents such as long chain primary amine salts and alkyltrimethyl ammonium salts or as nonionic surface active agents such as polyoxyethylene alkyl esters and polyethylene esters and as phosphorous containing agents such as dipolyoxyethylene alkyl ether phosphate or dipolyoxyethylene alkylphenyl ether phosphate.

Commonly, about 15% by weight of one or more emulsifying or coupling agents is added to the water along with lesser amounts of other additives such as defoaming agents, biocides, pH stabilizers such as calcium carbonate and primary, secondary and tertiary amines, and corrosion inhibitors such as mixed alkanolamine borate described in U.S. Pat. No. 4,778,614, the disclosure of which is incorporated herein by reference.

In some instances the oil/water emulsion may further include animal or vegetable oil or synthetic fluids as previously described and/or extreme pressure additives such as sulfurized fats and oils such as sulfurized lard, sulfurized sperm oil, sulfurized caster oil and phosphates such as tributyl phosphate in amounts ranging from about 5 to above 30% by weight of the emulsion composition disclosed in U.S. Pat. No. 4,822,507 referenced earlier. Oil/water compositions are characteristically emulsified in high speed mixers such as homogeneous blenders and possess the combined advantage of lubricity and corrosion inhibiting ability provided by the oil droplets and cooling ability provided by the water component making them applicable to a variety of metal grinding and cutting applications over broad speed ranges.

After a period of use however, the oil/water emulsions become contaminated with machine oil, commonly called tramp oil as well as with metal particles, metal cations, anionic salts and other foreign matter rendering them progressively unsuitable for continued use in machining operations.

Generally, oils are able to remain in a stable emulsion dispersion because of the presence of negatively charged emulsifying agents such as soaps and petroleum or synthetic sulfonates previously described. The negatively charged emulsifying agents, in theory, are attacked by the positively charged cations present and operate to ultimately neutralize the charges on the emulsifiers present in the metal working fluid.

Although anionic salts such as carbonates, sulfates, chlorides and phosphates may also be present in the metal working fluid, they are believed to operate to increase electrical conductivity and not to significantly interfere with the metal working fluid emulsion stability.

It has been the practice heretofore to either discard the contaminated fluid entirely or to separate the oil from the water component with filters such as microfilters such as where the water component can then be discarded at sea as disclosed in U.S. Pat. No. 4,846,976, the disclosure of which is incorporated by reference. Filters are also employed in U.S. Pat. Nos. 4,655,927 and 4,016,076, to separate oil from the contaminated emulsified metal working fluid and the disclosures of both of which are incorporated herein by reference. In U.S. Pat. No. 4,655,927, the filter is described as a cross-flow ultrafilter containing a polymeric (nylon) porous membrane that is of the type that can be used to advantage in the present invention.

Ultrafiltration of synthetic water based metal working fluids (not oil/water emulsions) and the maintenance of cross-flow ultrafilters is described in separate articles in Volume 47, 8 on pages 653-659 and on pages 686-690 of "Lubrication Engineering" (August, 1991).

However, in neither the aforedescribed Journal Articles nor patents is it taught or suggested that one could take reclaimed oil from a contaminated oil/water emulsion and again enhance the emulsion properties by adding a predetermined amount of water having an electrical volume resistivity of at least about 3000 ohm-cm.

Phase separation or layering of the oil and water components of the contaminated oil/water emulsion characteristically triggers concern about discarding the fluid under consideration. Heretofor neither high speed agitation nor high speed shearing nor the addition of additional emulsifying or coupling agents has been effective to suspend the oil droplets uniformly throughout the metal working fluid once the emulsifier charges have been neutralized as previously described. Nor has the re-introduction of the permeate effluents separated from the oil in an ultrafiltering operation been able to return the fluid to a uniform dispersion of oil droplets suspended in water.

In view of the environmental problems associated with discarding oil that is characteristically slow or resistant to degradation by micro-organisms, the present invention is of great value in the reclaiming of such oil emulsion for re-use as an emulsified oil/water metal working fluid derived by the addition of water thereto having a electrical volume resistivity of at least about 3000 ohm-cm.

Although not completely understood, it is believed that phase separation or layering of the contaminated metal working fluid is caused by the presence of increasing amounts of cations and anions present in the fluid as previously described and that such, along with water, are able to permeate through the filter membrane leaving behind the oil with substantially reduced amounts of such cations and anions rendering the oil again capable of providing a useful reconditioned oil/water emulsion type metal working fluid. Heretofor it was thought by those in the oil/water emulsion metal working industry that cations became attached such by ionic bonding to the outer surface of the individual oil droplet and would thus remain with the oil during a filtration process rather than pass through the filter and continue to render the oil unsuitable for use in making further emulsions since the presence of the cations led to deliterious layering of the oil and water. Surprisingly, it has been discovered that a substantial amount of the cations and anions does in fact separate from the oil in an ultrafiltering process hereinafter described and thus enables further use of the oil for forming another oil/water emulsion by replacing the contaminated water phase with uncontaminated water.

It is also believed that contamination of the oil/water emulsion with tramp oils containing zinc dialkyldithiophosphate (ZDP) releases both zinc and phosphate into the emulsion that respectively lend and leave themselves significantly to emulsion instability.

SUMMARY OF THE INVENTION

Accordingly, it is an object of this invention to provide a process for reclaiming a contaminated oil/water emulsion type metal working fluid.

It is another object of this invention to provide a process for reclaiming or reconditioning a contaminated oil/water emulsion that employs an ultrafilter to separate the oil from the other constituents of the fluid and then combines the separated oil with a predetermined amount of water having an electrical conductivity of at least about 3000 ohm-cm in an emulsifying operation.

It is yet a further object of this invention to provide a reclaimed oil/water emulsion that is derived from oil separated from a contaminated oil/water emulsion by means of ultrafiltration.

DESCRIPTION OF SOME PREFERRED EMBODIMENTS

Figure 1:
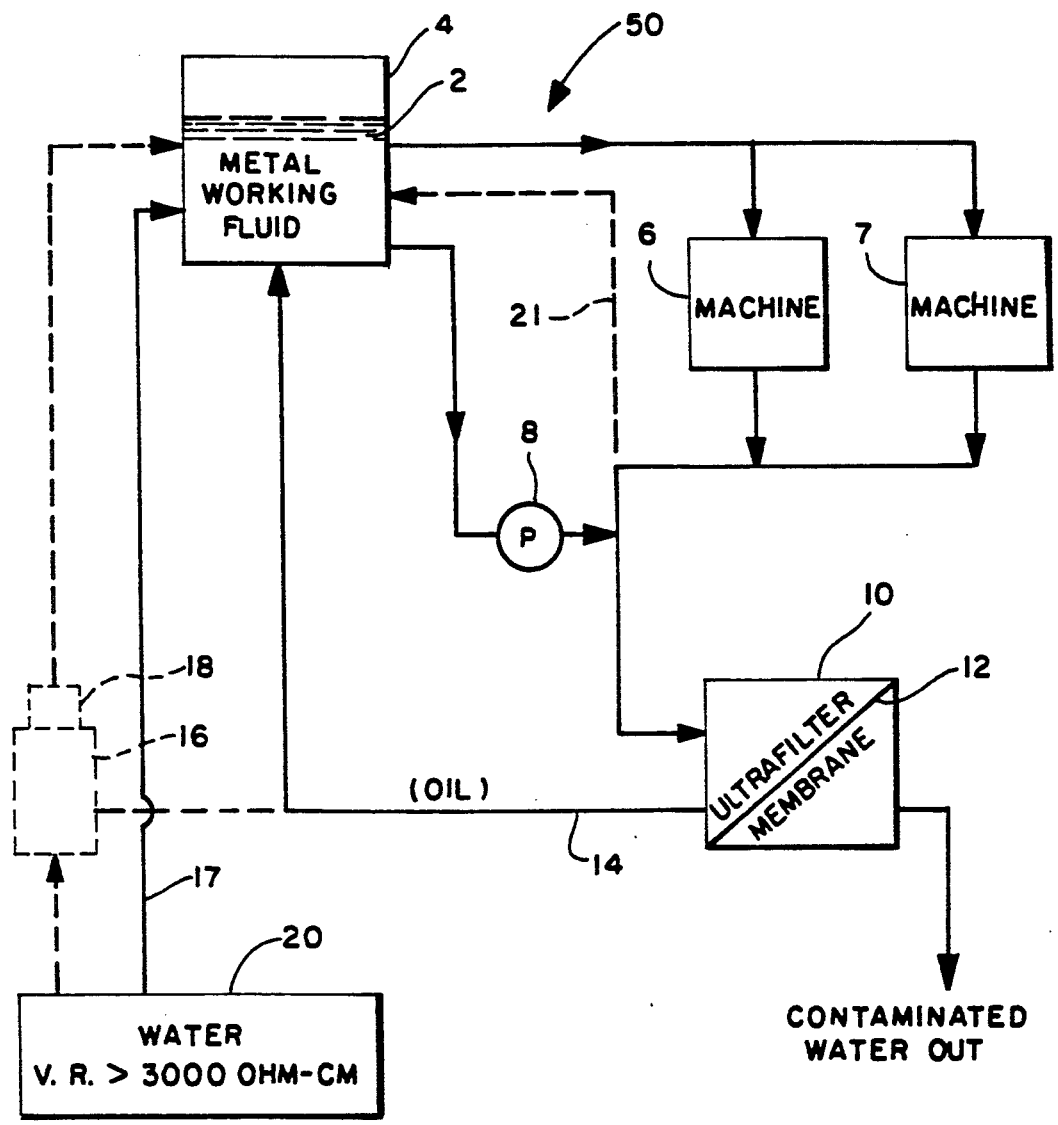
FIG. 1 is a block diagram of a preferred process 50 of the invention.

A preferred process 50 by which to continuously reclaim or recondition contaminated oil/water emulsion type metal working fluid is shown in FIG. 1 in which metal working fluid 2 is conveyed from a storage tank 4 to machines 6 and 7 for use in machining operations of the kind suitable for oil/water emulsions.

Fluid 2 is collected after use from machines 6 and 7 and conveyed to the input side of ultrafilter 10 having a porous membrane 12 therein. Fluid 2 is pressurized prior to entering ultrafilter 10 such as by being combined with the pressurized output of pump 8 that is conveying fluid 2 from reservoir 4 to ultrafilter 10.

Membrane 12 operates to separate the oil from the water which passes as permeate effluent through membrane 12 and is conveyed away as contaminated water that is believed to contain anions and the metal cations believed to be detrimental to oil/water emulsion as previously described. Although not shown in FIG. 1, other filters or separators may be included that separate metal particles and the like from fluid 2 before it reaches ultrafilter 10. The separated oil, referenced by numeral 14, is conveyed back to reservoir or storage chamber 4 which also receives a predetermined amount of pure water 17 such as distilled or deionized water from reservoir 20. Alternatively, oil 14 and pure water 17 may be conveyed to a blender 16 provided with an emulsifying mixing mechanism 18 and then conveyed as the reconditioned oil/water emulsion back to reservoir 4.

Ultrafilter 10 is preferably a cross-flow cartridge type filter in which the fluid is filtered at a direction of 90 degrees to the direction of main fluid flow through the cartridge. The fluid being filtered is characteristically pressurized to between 20 and 40 psig and suitable valves are employed on the inlet and outlet to provide a desired pressure differential across the filtering membrane. Preferably the input fluid pressure should be about 30 psig and the outlet pressure about 5 psig to provide a pressure differential of about 25 psig across the filtering membrane. For purposes of the present invention, a fluid flow rate through the ultrafilter is typically about 2 gallons per minute per 1 square foot of ultrafilter cartridge surface area plus or minus about 10% and yields a permeate flow rate of about 0.007 to about 0.025 gallons per minute per square feet of membrane surface area.

Understandably, other fluid flow patterns are possible whereas the flow path includes a closed loop such as indicated by reference numeral 21 wherein only a selected portion of the contaminated fluid is pressurized for passing through the ultrafilter with the rest returning directly back to the reservoir.

The filtering membrane is commonly made from a polymeric material such as nylon and has an average pore size of about 0.005 micron with a lower limit of about 0.001 micron and an upper limit of about 1.00 micron.

The pure water to be used in predetermined amounts with the separated oil may be tap water having an electrical volume resistivity of at least about 3000 ohm-cm which compares to a dissolved solids level of not more than about 160 parts per million. However, deionized or distilled water is preferred having an electrical volume resistivity of from about $50 \times 10^3$ ohm-cm to about $10^6$ ohm-cm which relates to a dissolved solids level of about 10 parts per million to 1 part per million respectively.

Advantages of the present invention are illustrated by the following example.

A sample of metalworking fluid was taken from a 20,000 gallon central fluid system after three months of service. The metalworking fluid was supplied by Metal Lubricants Co., Harvey, Ill., and is sold under the trademark RATAK MK. RATAK MK is a basic emulsified oil concentrate comprising of 80% oil in concentrate form, with 20% emulsifiers and other additives. The metalworking fluid was mixed with untreated city tap water having a volume resistivity of 3000 ohm-cm at a mix ratio of 20 parts city water to 1 part RATAK MK. During three months of service, the metalworking fluid received various amounts of make up of the above described city tap water and make up product RATAK MK, as well as additional emulsifiers, pH control products, and copper citrate for odor control. The fluid was contaminated with iron particles from the machining process and tramp oil containing ZDP. Even with these additives, the metalworking fluid would not form a stable emulsion. A stable emulsion is defined for the purposes of this invention by placing a sample of the product in a clear glass beaker and allowing it to stand for at least 24 hours. If the product is stable, minimal product will float to the top of the beaker, or even more significantly where there is no clear layer of water will be seen at the bottom of the beaker.

A 3200 milliliter sample of the above described fluid was mixed thoroughly in a shearing homogenizer for 30 seconds while in a 4000 milliliter beaker to prepare a homogeneous mixture. An equal portion of the sample was separated as samples A and B into two 2000 milliliter beakers. Sample A was passed through a ultrafilter cartridge until 1200 milliliters of contaminated water was removed, then 1200 milliliters of distilled 2000,000 ohm-cm water was added. Nothing was added to sample B (which was the untreated sample). Both samples A and B were mixed again for 30 seconds with the shearing homogenizer as used above. After 12 hours, sample B had began to phase separate, where as sample A was still a stable emulsion. After 72 hours, sample A was still a stable emulsion, and sample B continued to phase separate ever further. It should be noted that nothing was added to sample A chemically, only contaminated water from the metalworking fluid was removed by the ultrafilter and distilled water having the previously described quality was added in its place.

To further illustrate that the water removed in the above example from the metalworking fluid is believed to be the basis of the problem, 1,000 milliliters of the extracted water was set aside and to this water was added 50 milliliters of virgin RATAK MK. The sample was mixed thoroughly and set aside. For comparison, 1000 milliliters of distilled water with a specific resistance of 1,000,000 ohms-cm, was mixed with 50 milliliters of virgin RATAK MK and set aside. For comparison, 1000 milliliters of Cleveland, Ohio tap water with an electrical volume resistivity of 3900 ohm-cm, was mixed with 50 milliliters of virgin RATAK MK and set aside. All samples were stored in 2000 milliliter beakers. After 24 hours, the sample mixed with distilled water and the sample mixed with Cleveland tap water were completely stable, with absolutely no sign of phase separation or free floating product on the top of the sample. The sample mixed with recovered water had a layer of free floating product and the appearance of the emulsion was noticeably coarser. This example clearly illustrates that the extracted water was likely the basis for upsetting the original emulsion and that the RATAK MK was capable of making a stable emulsion.

To even further illustrate that cations are not irretrievably bound to the oil, 3 parts of water solution containing by weight about 66 grams calcium chloride as $CaCl_2 \cdot 2H_2O$ and 151 grams magnesium chloride as $MgCl_2 \cdot 6H_2O$ and 30 grams sodium chloride as $NaCl$ diluted into one liter of distilled water was added to 997 parts of distilled water having a volume resistivity of about 1,000,000 ohm-cm and homogenized into an emulsion at a rate of 20 parts water to one part RATAK MK after which a 1600 milliliter sample was set aside. Within 24 hours phase separation or layering occurred in the same. The layered sample was then homogenized to provide a consistant mixture and then the re-mixed emulsion sample was passed through an ultrafilter under conditions previously described resulting in 140 milliliters of permeate effluent that, when analyzed by mass balance techniques, contained about 20% by weight the cations and about 60% by weight of the anions originally added illustrating that emulsion degrading cations can in fact be separated from the oil by ultrafiltration rendering the oil again useful for making further emulsions.

The ultrafilter used in this example was a 1.0 square foot laboratory unit made by Romicon Inc., a Division of Rohm and Hass of Woburn, Mass. designated as a HF 1.0–45 CM50. Other tests were made with XM50 and PM 10, 1.0 square foot cartridges with the same results.

As previously described, predetermined amounts of one or more emulsifiers, pH stabilizers, biocides, odorant controllers and corrosion inhibitors may be added to the relaimed metal working fluid to enhance the stability.

What I claim is:

1. A process comprising reclaiming a contaminated oil/water emulsion type metal working fluid for reuse, said contaminated fluid comprising oil, water and contaminates including anions and metallic cations, and said process including the steps of;
    (a) providing an ultrafilter membrane having a pore size predetermined such that, when the contaminated fluid is filtered at a predetermined pressure differential thereacross, a substantial amount of the water and contaminants but not the oil are able to permeate as effluents therethrough, and
    (b) reclaiming the emulsion by emulsifying the oil of step (a) with a predetermined amount of water having an electrical volume resistivity of more at least 3000 ohm-cm.

2. The process of claim 1 wherein the water of step (b) has an electrical volume resistivity of from about $50 \times 10^3$ ohm-cm to about $10^6$ ohm-cm.

3. The process of claim 1 further including the step of adding a predetermined amount of at least one emulsifying agent to the oil of step (b).

4. The process of claim 1 further including the step of adding a predetermined amount of at least one pH stabilizing agent to the oil of step (b).

5. The process of claim 3 further including the step of adding a predetermined amount of at least one pH stabilizing agent to the oil of step (b).

6. A reclaimed oil/water emulsion type metal working fluid, said fluid reclaimed from a contaminated emulsified oil/water type metal working fluid comprising oil, water and contaminants including anions and metallic cations by a process including the steps of:

(a) providing an ultrafilter membrane having a pore size predetermined such that, when the contaminated fluid is filtered at a predetermined pressure differential thereacross, a substantial amount of the water and contaminants but not the oil are able to permeate as effluents therethrough, and (b) providing the reclaimed oil emulsion for reuse by emulsifying the oil of step (a) with a predetermined amount of water having an electrical resistance of at least about 3000 ohm-cm.

7. The reclaimed emulsified oil of claim 6 wherein the water of step (a) has an electrical volume resistivity of from about $50 \times 10^3$ ohm-cm to about $10^6$ ohm-cm.

8. The emulsified oil of claim 6 wherein step (b) further includes the step of adding a predetermined amount of at least one emulsifying agent to the oil.

9. The reclaimed emulsified oil of claim 8 wherein step (b) further includes the step of adding a predetermined amount of at least on pH stabilizing agent to the oil.

10. The reclaimed emulsified oil of claim 6 wherein step (b) further includes the step of adding a predetermined amount of at least on pH stabilizing agent to the oil.

* * * * *